(12) United States Patent
Dobroth et al.

(10) Patent No.: US 8,208,964 B2
(45) Date of Patent: Jun. 26, 2012

(54) FLEXIBLE HOME PAGE LAYOUT FOR MOBILE DEVICES

(75) Inventors: Kathryn Mary Dobroth, Jamaica Plain, MA (US); Hannah Youngsil Moon, Boston, MA (US)

(73) Assignee: Cellco Partnership, Basking Ridge, NJ (US)

( * ) Notice: Subject to any disclaimer, the term of this patent is extended or adjusted under 35 U.S.C. 154(b) by 286 days.

(21) Appl. No.: 12/609,566

(22) Filed: Oct. 30, 2009

(65) Prior Publication Data
US 2011/0105187 A1 May 5, 2011

(51) Int. Cl.
*H04M 1/00* (2006.01)
(52) U.S. Cl. .................................................. 455/566
(58) Field of Classification Search .......... 455/566, 455/556.2, 556.1, 550.1, 90.1, 90.2, 90.3; 379/93.19
See application file for complete search history.

(56) References Cited

U.S. PATENT DOCUMENTS

| 5,771,042 | A | 6/1998 | Santos-Gomez | |
|---|---|---|---|---|
| 6,008,809 | A | 12/1999 | Brooks | |
| 7,705,833 | B2 * | 4/2010 | Kim | 345/173 |
| 7,791,594 | B2 * | 9/2010 | Dunko | 345/173 |
| 7,800,592 | B2 * | 9/2010 | Kerr et al. | 345/173 |
| 7,812,856 | B2 * | 10/2010 | Ortiz et al. | 348/159 |

* cited by examiner

*Primary Examiner* — Eugene Yun

(57) ABSTRACT

The flexible user interface layout includes a split-screen display that provides flexibility in determining which information will be displayed on the screen, such as a home page. The screen may be divided into display panes in which a user may drag a center point or node of intersection to increase the size of a selected display pane, while reducing the size of at least some of the other display panes. Each display pane may contain a different page selected by the user, or displayed by default. The pages may also be customizable such that the user can create pages and select which content to display on a particular page.

18 Claims, 4 Drawing Sheets

FLEXIBLE HOME PAGE LAYOUT FOR MOBILE DEVICES

TECHNICAL FIELD

The present subject matter relates to a flexible home page layout for a mobile terminal device having a touch panel display and a method for operating the same. Examples of the mobile terminal device include a cellular phone, a PDA (Personal Digital Assistant) and a mobile computer or tablet, which include a touch panel display as an input device.

BACKGROUND

Many mobile terminals such as cellular phones, PDAs or mobile computers use a touch panel display as an input device for a user to input instructions or commands into the terminal. For example, the user can dial a phone number by touching numbers displayed on the touch panel display. Further, since the mobile terminals have a variety of functions and applications other than a phone, the touch panel display has become a more important feature for the mobile terminals as an input device of the commands or instructions for the functions and applications. As such, it is necessary to organize and make available the various functions and applications available to a user. However, the amount of information that can be displayed on the touch panel at a time is constrained by the amount of space available on the panel.

In recent years, many cellular phones have allowed users to create multiple pages having links to applications. As a result, ways of allowing a user to navigate between multiple pages developed because the space available on the touch panel for displaying pages is limited. In one example, a single page may be viewed at a time on the touch panel display. Thus, in order to view a different page, a user must scroll to the right or left to move another page into the display. In another example, a cube is provided that displays different pages on different sides of the cube. A user can rotate or spin the cube to view the different pages. A side of the cube displaying a page may then be expanded to fill the touch panel display. Thereafter, a user may select a particular application from the page displayed.

Hence a need exists for a user interface layout that allows a user to view and select from multiple pages on a single display, while also allowing the adjustment of the amount of space that is allocated to each page.

SUMMARY

The teachings herein alleviate one or more of the above noted problems by providing a new flexible user interface layout described herein. In one exemplary solution, a method for operating a mobile terminal comprising a touch panel display is disclosed. The method includes the step of displaying an active viewing space on the touch panel display, wherein the active viewing space is divided into at least three display panes and exhibits a point of intersection of the boundaries of the display panes. The method also includes the step of displaying a different respective page in each display pane of the active viewing space on the touch panel display. Also disclosed is the step of detecting touching of the touch panel display in such a manner as to indicate user intent to move the point of intersection on the touch panel display. In response to an amount of intended movement of the point of intersection that is indicated by the detected touching, the method includes the steps of moving the point of intersection on the touch panel display by the intended movement amount, reducing size of at least two of the display panes in the active viewing space and an amount of the respective pages displayed therein, and concurrently increasing the size of at least one of the display panes and an amount of the respective page displayed in each increased size display pane in the active viewing space, based on the intended movement amount of the point of intersection on the touch panel display.

In a further exemplary solution, in response to a user selecting a page for display in the active viewing space, the method includes displaying the selected page in at least one of the display panes. In another example, in response to a user selecting content information for display with a page, the method includes displaying the selected content information with the page in at least one of the display panes. The method, in yet another example, may include the step of obtaining a page for at least one of the display panes of the active viewing space via at least one of a wireless communication via a mobile network or memory of the mobile terminal. In still another example, the method may include the steps of obtaining content information for display with a page via at least one of a wireless communication via a mobile network or memory of the mobile terminal.

In another disclosed exemplary solution, a mobile device comprises a touch panel display, a wireless transceiver for wireless communication via a mobile network, and a controller for controlling the transceiver and responsive to user inputs via the touch panel display. The controller is configured to implement functions comprising displaying an active viewing space on the touch panel display. The active viewing space is divided into at least three display panes and has a point of intersection of the boundaries of the display panes. The device displays a different respective page in each display pane. The controller is configured to detect touching of the touch panel display in a manner to indicate user intent to move the point of intersection. The controller, in response to an amount of intended movement of the point of intersection indicated by the detected touching, implements functions including moving the point of intersection by the intended movement amount, and reducing the size of at least two of the display panes and an amount of the respective pages displayed therein, and concurrently increasing the size of at least one of the display panes and an amount of the respective page displayed in each increased size display pane, based on the intended movement amount of the point of intersection.

The controller, in another example, may be configured to display a page selected by the user in at least one of the display panes. The controller may also be configured to display content information selected by the user for display with a page in at least one of the display panes. In a further example, the controller may also be configured to obtain a page for at least one of the display panes via at least one of the wireless transceiver via the mobile network or memory of the mobile terminal. In another example, the controller may be configured to obtain content information display with a page via at least one of the wireless transceiver via the mobile network or memory of the mobile terminal.

In yet another exemplary solution, a method is provided for operating a mobile terminal comprising a touch panel display. The method includes the step of displaying an active viewing space comprising four display panes and one point of intersection of boundaries of all the display panes, on the touch panel display of the mobile terminal. Each of the four display panes display a different respective page. The method also includes the step of detecting touching of the touch panel display in such a manner as to indicate user intent to move the point of intersection of the boundaries of the display panes on the touch panel display. In response to an amount of intended movement of the point of intersection indicated by the detected touch, the method further includes the steps of moving the point of intersection on the touch panel display by the intended movement amount. In addition, the method includes the steps of concurrently increasing size of at least one of the display panes and an amount of the respective page displayed in the increased size display, and reducing size of at least two of the display panes and reducing an amount of the respective pages displayed in each reduced size display pane, based on the intended movement amount of the point of intersection.

The flexible user interface layout and methods for implementing the same as outlined above may be implemented as various combinations of method technologies, mobile terminal hardware and associated software (program instructions). The software may be downloaded from system hardware connected to communicate with the mobile terminal directly or via wireless network(s). System hardware may comprise special purpose hardware or one or more general purpose devices programmed to implement the software download functions. A software product or "article of manufacture" includes at least one machine readable medium and information carried by the medium. The information carried by the medium may be executable program code and data for the flexible user interface layout, which enable a programmable mobile terminal device to implement the flexible user interface layout related functions like those discussed in more detail below.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein offer a new user interface layout for a mobile terminal device, which includes a split-screen display that provides flexibility in determining which information will be displayed on the screen, such as a home page. In one example, the screen is divided into four display panes in which a user may drag a center point or node of intersection to increase the size of a selected display pane, while reducing the size of at least two of the other display panes. Each display pane contains a page selected by the user, or displayed by default. The home page is customizable, for example, the user may select which pages to display within the display panes. In addition, the pages may be customizable so that the user can create pages and select which content to display on a particular page.

Figure 1:
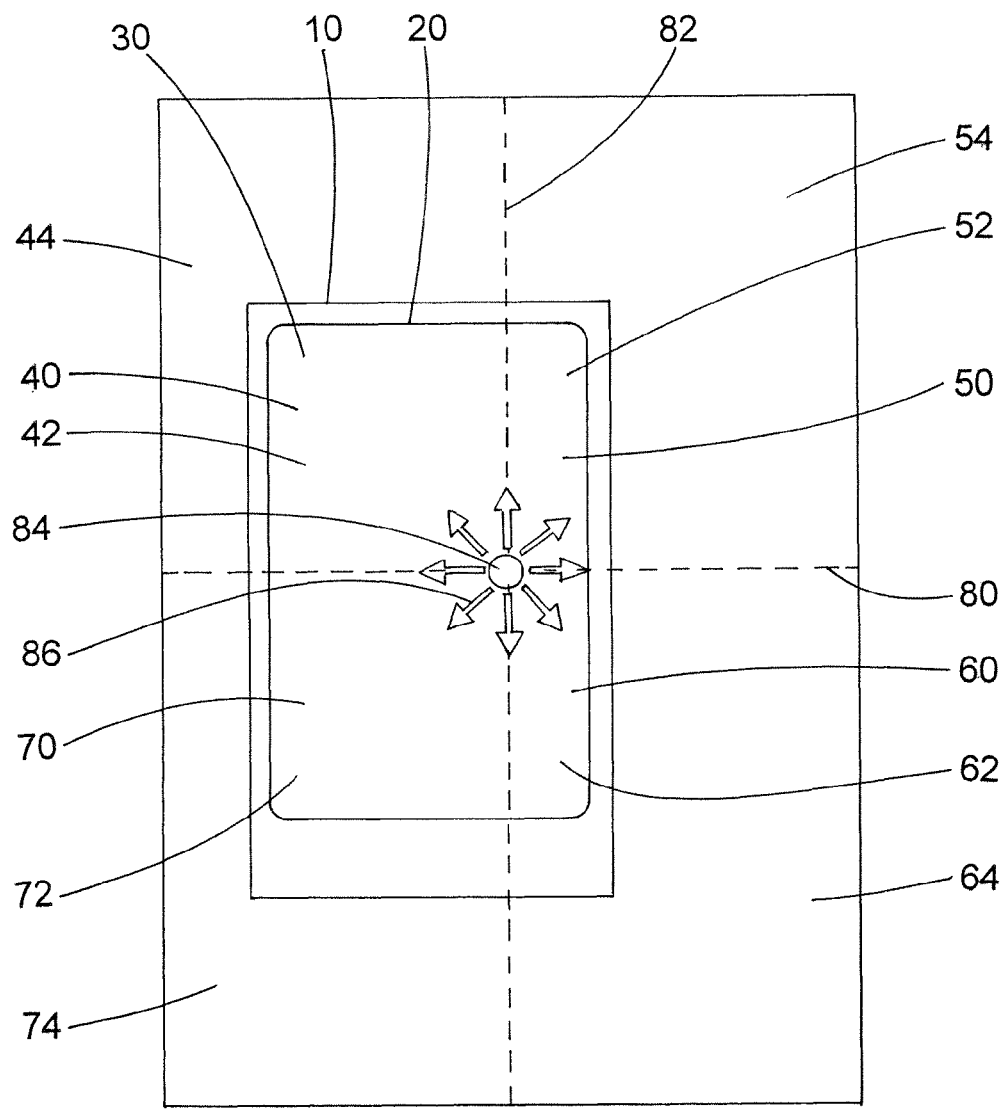
FIG. 1 is an illustration of an exemplary mobile terminal user interface layout.

Reference now is made in detail to the examples illustrated in the accompanying drawings discussed below. FIG. 1 illustrates an exemplary mobile terminal device 10 having a touch panel display 20. The touch panel display 20 includes an active viewing space 30, which may comprise the entire touch panel display 20 or a portion thereof. The active viewing space 30 is divided to create a split-screen display, which in this example comprises four display panes 40, 50, 60, and 70. The display panes are formed by a horizontal boundary 80 and a vertical boundary 82. As is seen from FIG. 1, each of the display panes 40, 50, 60, 70 includes an active portion 42, 52, 62, 72 and an inactive portion 44, 54, 64, 74. The active portion of each display pane is the portion of the pane displayed within the active viewing space 30, while the inactive portion of each display pane is the portion of the pane not displayed within the active viewing space 30. It will be understood that different amounts, sizes, and shapes of display panes may be provided to create a split-screen display for displaying multiple pages within the active viewing space 30, such as a split-screen display divided into three, five, or more display panes of the same or different sizes having a variety of shapes, but preferably rectangular.

As shown in FIG. 1, an intersection point 84 resides at the intersection of horizontal boundary 80 and vertical boundary 82 within the active viewing space 30 of touch panel display 20. The intersection point 84 may be represented by any character, such as a node, bullet point, or similar character, but may also be in the form of the intersection of the boundary lines of the display panes. The intersection point 84 is movable within the active viewing space 30 in all directions as illustrated by directional arrows 86. Movement of the intersection point 84 increases or decreases the active portion of each display pane. For example, as shown in FIG. 1, the intersection point 84 is positioned such that active portion 42 of display pane 40 and active portion 72 of display pane 70 are larger than active portion 52 of display pane 50 and active portion 62 of display pane 60. It will be understood that more than a single point as well as other means for changing the size of the display panes may be utilized separately, or in combination. For example, two or more points may be provided to add multiple degrees of movement to the display panes. In another example, the boundaries of the display panes may be movable to vary the size of the display panes. In this instance, for example, the split-screen display of the touch panel may be divided into at least two panes. The split-screen may be created by horizontal or vertical boundaries, which are movable to modify the size of a respective pane. In a further example, the split-screen display comprises three or more horizontal and/or vertical panes created by respective horizontal and/or vertical boundaries, which are also movable to modify the size of a respective pane. Additionally, various combinations of moveable points of intersection and moveable boundaries are also contemplated by the present disclosure.

Figure 2:
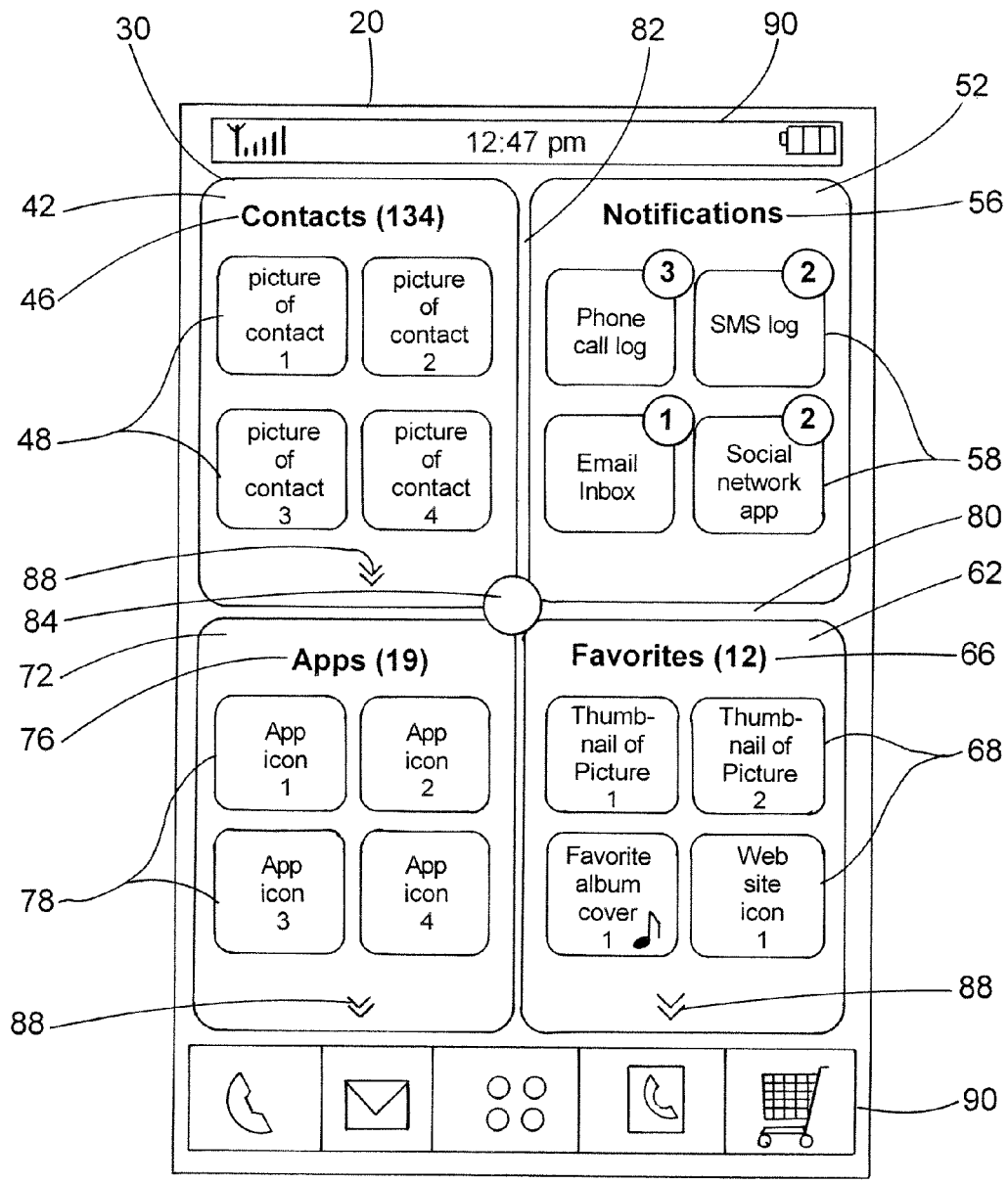
FIG. 2 is an illustration of an another exemplary mobile terminal user interface layout.

The display panes contain pages selected by the user, or displayed by default. Turning to FIG. 2, an example of the flexible layout is shown with a page displayed in each display pane. The pages may include content information. In one example, as shown in FIG. 2, the active portion 42 of pane 40 is populated with a Contacts page 46. Likewise, active portions 52, 62, and 72 are populated with a Notification page 56, a Favorites page 66, and an Apps page 76, respectively. A page may include, for example, the title of the page being displayed, and other information, such as the number of items associated with the page. It will be understood that different pages than that described and illustrated in FIGS. 2 and 3, may be displayed in a display pane of the active viewing space 30.

Figure 3:
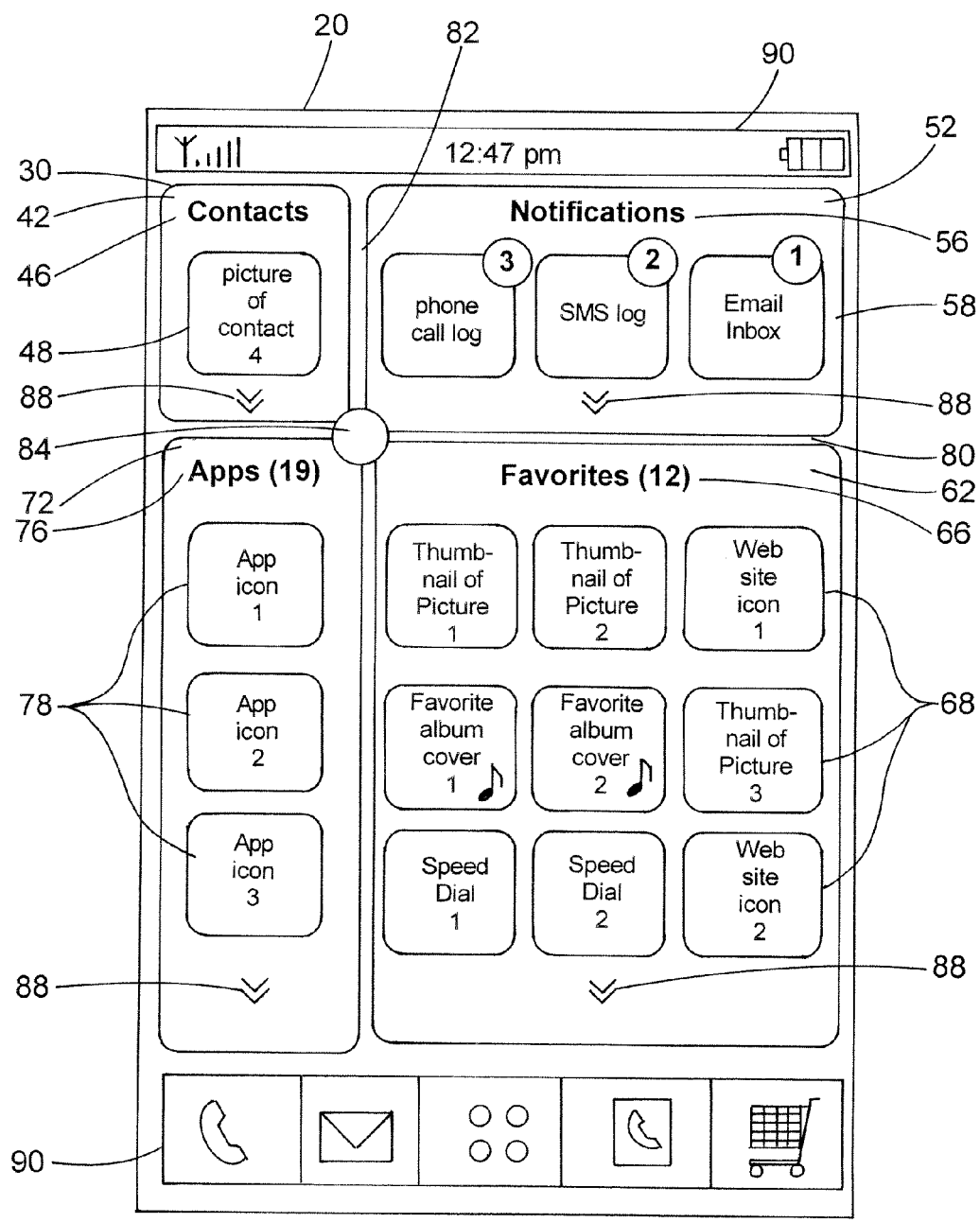
FIG. 3 is an illustration of an exemplary mobile terminal user interface layout.

As shown in FIGS. 2 and 3, content information is also displayed on each page in each display pane. For example, content information 48 is displayed in the active portion 42 of pane 40. Similarly, content information 58, 68, and 78 is displayed in the active portions 52, 62, and 72 of panes 50, 60, and 70, respectively. The content information may include icons, graphics, or other suitable display items, which link to applications, data, websites, lists, or other functions or other information of the mobile terminal. As shown in FIGS. 2 and 3, for example, content information includes application icons, photographs of contacts, thumbnails of favorite pictures, links to favorite playlists or albums, web site icons, speed dial icons, phone call logs, SMS logs, email inbox links, and links to social network application. It will also be understood that different information than that described and illustrated in FIGS. 2 and 3 may comprise the content information of the present application. In one example, touching the graphics or icons displayed on the touch panel display 20 will connect to and/or execute the applications, data, websites, lists, or other functions or other information represented by these graphics or icons.

The page displayed in the active portion of each display pane may also include a scrolling function to view content information not displayed in the active viewing space 30, but residing on the inactive portions of the display panes. For example, as shown in FIGS. 2 and 3, scrolling arrows 88 are displayed in the active portions 42, 62, and 72 of panes 40, 60, and 70, respectively. The scrolling arrows 88 allow content information residing in the inactive portions of the display panes to be displayed within the active viewing space 30 and the active portions of the display panes. For example, the arrows 88 when touched by a user, move the page in the direction of the arrow, thereby moving content information residing in the inactive portion of the display pane into the active viewing space 30 and the active portions of the display panes. As the content information is moved from the inactive portion into the active portion of a display pane, the content information previously displayed in the active portion may move into the inactive portion of the display pane. Preferably, the scrolling function and the title of the page will be displayed within the active viewing space 30 and active portions of the display panes during movement of the content information, and will not move with the content information as the content information moves into and out of the active viewing space 30. It will be understood that other mechanisms and icons may be used as the scrolling functions, for example, sliding bars, functional buttons, or any other mechanisms to scroll amongst the various content information.

The active viewing space 30 and the mobile terminal employing the same provide personal modification and customization of the display panes which meets the specific user's needs. For example, a user may select which pages to display within one or more of the display panes based on the frequency of which the user utilizes a particular page. The more frequently utilized pages may be displayed in the display panes while the less utilized pages are not displayed. Likewise, the more utilized pages may be positioned in a more prominent position which the user selects. In one example, a Contacts page and Favorites page may be displayed in the upper display panes while the lower display panes display other less used pages. In another example, the pages may be personalized and customized so that the user can create pages and select which content information to display on a particular page. In addition, content information may be associated with and appear on more than one page. Further, the position and arrangement of the content information on a page may be customized and selected by the user.

As in the discussion of FIG. 1 above, the intersection point 84 is formed by the intersection of boundaries 80, 82 and is movable in all directions within the active viewing space 30. As shown in FIG. 2, the intersection point 84 resides in the center portion of active viewing space 30. As such, a page is displayed in each display pane, which may include content information. Turning to FIG. 3, the intersection point 84 has been repositioned in response to touching of the touch panel display by a user, such that the active portion 62 of display pane 60 has increased in size as compared with FIG. 2, and occupies a greater portion of the active viewing space 30. Consequently, the active portions, 42, 52, and 72 have decreased in size as compared with FIG. 2, and occupy a smaller portion of the active viewing space 30. As can be seen from FIGS. 2 and 3, the amount of page 66, including content information 68, displayed in active portion 62 increases as the size of the active portion 62 increases in response to movement of the intersection point 84. Likewise, the amount of pages 46, 56, and 66, including content information 48, 58, and 68, displayed in active portion 42, 52, 62, respectively, decreases as the size of active portions 42, 52, 62 decrease in response to movement of the intersection point 84. The intersection point 84 may be moved to any point within the active viewing space 30, and as such, may not display and as a result cut off portions of the page and content information displayed therein. Preferably, the mobile terminal device includes functionality to automatically fit the amount of content information to the size of the active portions, and to automatically adjust the page to fit within the active portion of each respective display pane.

The touch panel display 20 may optionally include a fixed viewing space 90 for content information, including information related to signal strength, time and/or date information, battery life, or other information which is not affected by movement of the intersection point 84. As shown in FIGS. 2 and 3, the fixed viewing space 90 appears above and below the active viewing space 30. The functionality of the active viewing space 30 and movement of the intersection point 84 is not affected by the presence of the fixed viewing space 90. In addition, the fixed viewing space 90 may be located at any position within the touch panel display, and is preferably located along the edge portions of the display to allow the active viewing space to be displayed at a centered or centralized position within the touch panel display.

In one example, a convenient method is utilized for operating the touch panel display, an illustration of which is shown in FIGS. 2 and 3. As shown in FIG. 2, the four display panes are substantially the same size, and accordingly comprise substantially an equal amount of the active viewing space 30 of touch panel display 10. Pages, which as shown are different respective pages, are displayed within the active portion of each display pane. For example, a Contacts page and its content information are displayed in display pane 40, a Notifications page and its content information are displayed in display pane 50, a Favorites page and content information associated therewith are displayed in display pane 60, and an Apps page and content information associated therewith are displayed in display pane 70. When a user desires to view more of a particular page, including more contact information, the user may contact the touch panel display, and in particular contact the intersection point 84. As the user contacts the touch panel display 10 and moves the intersection point 84, the touch panel display 10 detects touching of the display in such a manner as to indicate the user's intent to move the intersection point 84. In response to the detected touching by the touch panel display 10, the intersection point 84 is moved by the intended movement amount of the user. As the intersection point 84 moves, at least two of the display panes reduce in size which also reduces the amount of the page displayed, including the content information displayed therein, based on the intended movement amount. Likewise, as the intersection point 84 moves, at least one of the display panes is increased in size and an amount of the page displayed, including the content information displayed therein, is also increased, based on the intended movement amount of the intersection point 84. One example of the intersection point 84 movement is illustrated in FIG. 3. As can be seen, the movement of the intersection point 84 causes the amount of the page displayed to increase, while the amount of the page displayed in the active portions within the other display panes decreases. As discussed above, the intersection point 84 may be moved to any position within the active viewing space 30 to increase and/or decrease the amount of the page displayed for a respective display pane.

Those skilled in the art should be quite familiar with the structure, programming and operation of a variety of different touch screen mobile devices that might utilize the flexible home page layout as part of the mobile station's graphical user interface. However, for general completeness and to perhaps help some readers appreciate an actual implementation of the home page layout technology, it may be helpful to briefly consider a high-level example of a particular mobile station device with respect to FIG. 4.

Figure 4:
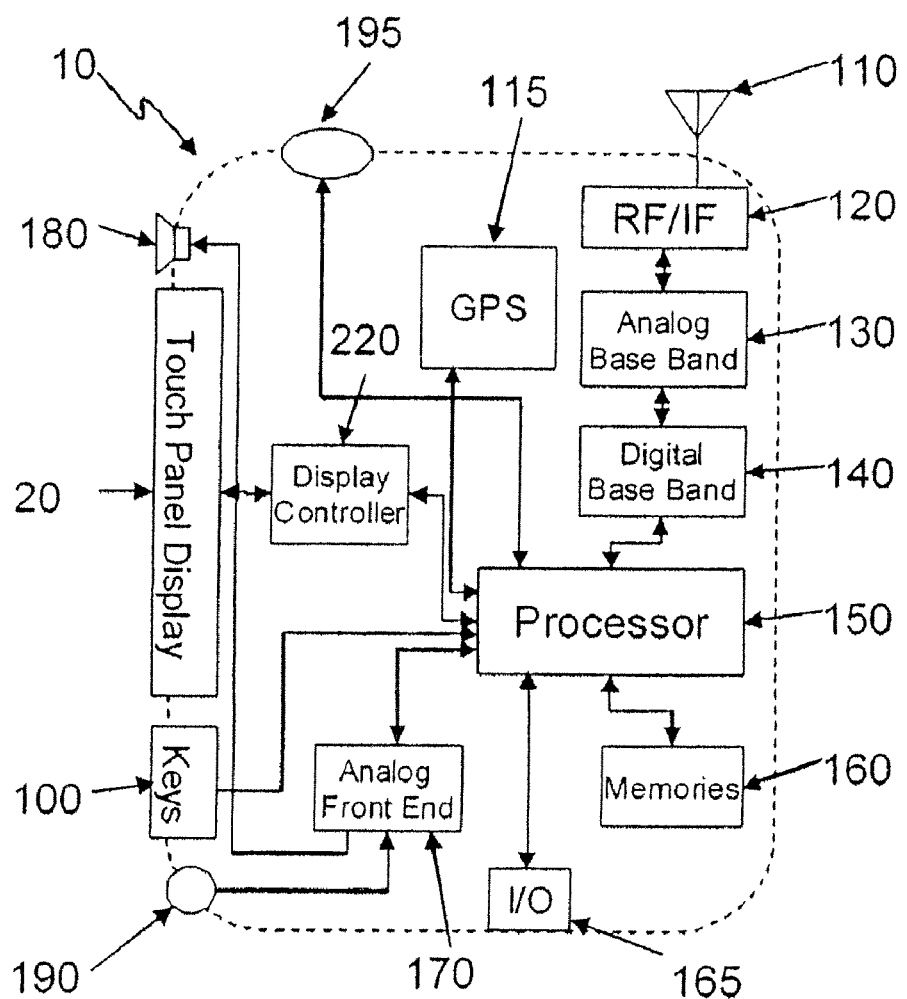
FIG. 4 is an exemplary block diagram of a mobile terminal having a touch panel display.

FIG. 4 shows an exemplary block diagram of the mobile terminal 10, which may be programmed or otherwise configured to provide the page layout of FIGS. 1-3. The exemplary mobile terminal 10 has a touch panel display 20. The mobile terminal 10 comprises keys 100, an RF interface 120 connected to the antenna 110, an analog base band processor 130 and a digital base band processor 140 connected to a processor 150. A display controller or driver 220 is connected to the touch panel display 20 and the processor 150, for controlling the touch panel display 20. An analog front end processor 170 is connected to the processor 150 and controls the speaker 180 and the microphone 190. The processor 150 controls the display controller 220, RF circuits (120, 130 and 140) and the analog front end processor 170. The processor 150 also connects to one or more memories 160. The memories 160 may comprise a RAM, a ROM or a flash memory, and may include a removable memory card. The mobile terminal may include a camera (still and/or video) 195 to take a picture or a video. The mobile terminal may further include a GPS (Global Positioning System) receiver 115 for use in locating the position of the mobile terminal 10. The mobile terminal may further include an input/output (I/O) terminal 165. The I/O port may be a USB port.

In this embodiment, the touch panel display 20 is controlled by the display controller 220. The display controller may detect and respond to the touching of the touch panel display by the user. However, the display controller may be included in the touch panel display 20 or in the processor 150, and may be any controller configured to control outputs on and respond to touching of the touch panel display 20. The display controller may also be controlled by the processor 150 and/or software. In the embodiment, the touch panel display 20 is configured to be controlled by, e.g. the display controller 220 and the display controller 220 is configured to be controlled by, e.g. the processor 150.

In an exemplary operation of the touch panel display of the present application, the intersection point 84 is positioned in a default position, such as that shown in FIG. 2. A user may either select pages to display in the display panes, or by default the display panes may be populated, or a combination of both. Similarly, a user may select content information for display with a particular page, or by default the display panes may be populated with content information, or a combination of both. To view more of a page, the intersection point 84 is moved to increase the size of the display pane in which the page is displayed. In doing so, the display controller 220, for example, detects touching of the touch panel display, and in response to an amount of intended movement of the intersection point 84, moves the point of intersection by the intended movement amount. As shown in FIG. 3, for example, the movement of the intersection point 84 reduces the size of the active portions 42, 52, and 72 of display panes 40, 50, and 70, respectively, while increasing the size of active portion 62 of display pane 60. As a result, more of the page is displayed within the active portion 62 of display pane 60. The intersection point 84 may be moved to any position within the active viewing space 30 of the touch panel display 20 to cause the active portions of the display panes to increase and/or decrease.

The mobile terminal device of the present application may access content information, such as an applications, websites, or other information from outside the mobile terminal and download new application programs, pages, or other information from outside of the mobile terminal, for example, through wireless communication via a wireless network. The mobile terminal device may also utilize programs, pages, or other information stored on memory of the mobile terminal device. For example, the user may access a predetermined website through the browser function of the mobile terminal. From the website, the user may select a new application program. The mobile terminal then downloads the application program and stores it in the memory. The new icon or icons associated with the new application program may be included with a particular page by default or may be customizable by the user for display with a particular page. For example, upon finishing the download, the mobile terminal may prompt the user to determine in which page he/she wishes to create a new icon associated with the new application program. The controller of the mobile terminal may then cause the display panel to display a new icon or icons associated with the new application program on the selected page in a display pane of the active viewing space 30. Further, depending on the application program, the mobile terminal may automatically arrange or modify the icons within the active viewing space 30. In addition, the new icon or icons may be displayed such that they are not displayed in the active viewing space, but still reside on a page in the inactive viewing space.

In the above described examples, the flexible user interface layout is provided for the mobile terminal device, such as a mobile phone. However, this user interface may be portable across different platforms, for example, from the display of a mobile terminal to a PC screen or a TV screen. The mobile terminal may be configured to have an input/output terminal 165, for example, a USB port. When the input/output terminal is connected to a USB port of the PC and an appropriate application program is installed in the PC, the flexible user interface layout of the mobile terminal may be displayed on the PC screen. On the PC screen, the user may modify the page and select which page to display in a particular display pane. In addition, the user may move the intersection point 84 to display more content information of a particular page. In another example, the user may select and/or download content information for display with a particular page or pages from the PC. The downloaded information or data can be transmitted to the mobile terminal via the USB connection, the wireless network or a detachable storage device. This feature may provide the user more easy operation of the mobile terminal.

As set forth above, the graphical user interface functions of the mobile terminal having a touch panel display may be achieved by any combination of the software and hardware in the mobile terminal. When the above functions of the mobile terminal are implemented in software for programming the processor of the mobile terminal, the software may be stored in an article of manufacture, such as a CD-ROM, DVD-ROM, Flash memory, hard disc or other types of storage media. The software, i.e., programming instructions embodied in the storage media are executed by a programmable controller, for example a processor 150 of the exemplary mobile terminal 10 having a touch panel display 20, wherein execution of the software by the processor 150 causes the mobile terminal 10 to execute the variety of tasks, i.e., operations as set forth above.

The flexible user interface layout disclosed herein provides numerous advantages over prior art mobile terminals having touch panel interfaces. Most importantly, the described interface of the mobile terminal provides and allows users the ability to organize their content using different pages, which users can view several pages of content at once as well as control the amount of spaced allocated for a particular page. Another advantage associated with the disclosed interface for the mobile terminal is that it may provide a more readily customized mobile terminal having a touch panel display.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

CD-ROM—Compact Disc Read-only Memory
DVD-ROM—Digital Video Disc Read-only Memory
GPS—Global Positioning System
IF—Intermediate Frequency
I/O—Input/Output
PC—Personal Computer
PDA—Personal Digital Assistant
RAM—Random-access Memory
ROM—Read-only Memory
RF—Radio Frequency
SMS—Short Message Service
TV—Television
USB—Universal Serial Bus

What is claimed is:

1. A method for operating a mobile terminal comprising a touch panel display, the method comprising steps of:
displaying an active viewing space on the touch panel display, the active viewing space being divided into at least three display panes and exhibiting a point of intersection of boundaries of the display panes;
displaying a different respective page in each display pane of the active viewing space on the touch panel display;
detecting touching of the touch panel display in such a manner as to indicate user intent to move the point of intersection on the touch panel display;
responsive to an amount of intended movement of the point of intersection indicated by the detected touching, moving the point of intersection on the touch panel display by the intended movement amount;
reducing size of at least two of the display panes and an amount of the respective pages displayed therein in the active viewing space, based on the intended movement amount of the point of intersection on the touch panel display; and
concurrently increasing size of at least one of the display panes and an amount of the respective page displayed in each increased size display pane in the active viewing space, based on the intended movement amount of the point of intersection on the touch panel display.

2. The method of claim 1, wherein responsive to a user selecting a page for display in the active viewing space, displaying the selected page in at least one of the display panes.

3. The method of claim 1, wherein responsive to a user selecting content information for display with a page, displaying the selected content information with the page in at least one of the display panes.

4. The method of claim 1, further comprising:
obtaining a page for at least one of the display panes of the active viewing space via at least one of a wireless communication via a mobile network or memory of the mobile terminal.

5. The method of claim 1, further comprising:
obtaining content information for display with a page via at least one of a wireless communication via a mobile network or memory of the mobile terminal.

6. A mobile device, comprising:
a touch panel display;
a wireless transceiver, for wireless communication via a mobile network; and
a controller for controlling the transceiver and responsive to user inputs via the touch panel display, wherein the controller is configured to implement tasks, including tasks to:
display an active viewing space on the touch panel display, the active viewing space being divided into at least three display panes and exhibiting a point of intersection of boundaries of the display panes;
display a different respective page in each display pane of the active viewing space on the touch panel display;
detect touching of the touch panel display in such a manner as to indicate user intent to move the point of intersection on the touch panel display;
wherein in response to an amount of intended movement of the point of intersection indicated by the detected touching, the controller is further configured to implement tasks to:

move the point of intersection on the touch panel display by the intended movement amount;

reduce size of at least two of the display panes and an amount of the respective pages displayed therein in the active viewing space, based on the intended movement amount of the point of intersection on the touch panel display; and concurrently increase size of at least one of the display panes and an amount of the respective page displayed in each increased size display pane in the active viewing space, based on the intended movement amount of the point of intersection on the touch panel display.

7. The device of claim 6, wherein in response to a user selecting a page for display in the active viewing space, the controller is configured to implement a task to display the selected page in at least one of the display panes.

8. The device of claim 6, wherein in response to a user selecting content information for display with a page, the controller is configured to implement a task to display the selected content information with the page in at least one of the display panes.

9. The device of claim 6, wherein the controller is further configured to obtain a page for at least one of the display panes of the active viewing space via at least one of the wireless transceiver via the mobile network or memory of the mobile terminal.

10. The device of claim 6, wherein the controller is further configured to obtain content information for display with a page via at least one of the wireless transceiver via the mobile network or memory of the mobile terminal.

11. An article of manufacture, comprising:
a non-transitory machine readable storage medium; and
programming instructions embodied in the medium for execution by a programmable controller of a mobile terminal having a touch panel display and a wireless transceiver, wherein execution of the programming instructions by the programmable controller causes the mobile terminal to implement tasks, comprising tasks to:
display an active viewing space on the touch panel display, the active viewing space being divided into at least three display panes and exhibiting a point of intersection of boundaries of the display panes;
display a different respective page in each display pane of the active viewing space on the touch panel display; and
detect touching of the touch panel display in such a manner as to indicate user intent to move the point of intersection on the touch panel display;
responsive to an amount of intended movement of the point of intersection indicated by the detected touching, moving the point of intersection on the touch panel display by the intended movement amount;
reduce size of at least two of the display panes and an amount of the respective pages displayed therein in the active viewing space, based on the intended movement amount of the point of intersection on the touch panel display; and
concurrently increase size of at least one of the display panes and an amount of the respective page displayed in each increased size display pane in the active viewing space, based on the intended movement amount of the point of intersection on the touch panel display.

12. The article of manufacture of claim 11, wherein in response to a user selecting a page for display in the active viewing space, execution of the programming instructions by the controller further causes the mobile terminal to implement a task to:

display the selected page in at least one of the display panes.

13. The article of manufacture of claim 11, wherein in response to a user selecting content information for display with a page, execution of the programming instructions by the controller further causes the mobile terminal to implement a task to:
display the selected content information with the page in at least one of the display panes.

14. The article of manufacture of claim 11, wherein execution of the programming instructions by the controller further causes the mobile terminal to implement a task to:
obtain a page for at least one of the display panes of the active viewing space via at least one of the wireless transceiver via wireless communication with a mobile network, memory of the mobile terminal, or the non-transitory machine readable storage medium.

15. The article of manufacture of claim 11, wherein execution of the programming instructions by the controller further causes the mobile terminal implement a task to:
obtain content information for display with a page via at least one of the wireless transceiver via wireless communication with a mobile network, memory of the mobile terminal, or the machine readable storage medium.

16. A method for operating a mobile terminal comprising a touch panel display, the method comprising steps of:
displaying an active viewing space comprising four display panes and one point of intersection of boundaries of all the display panes, on the touch panel display of the mobile terminal, each of the four display panes displaying a different respective page;
detecting touching of the touch panel display in such a manner as to indicate user intent to move the point of intersection of the boundaries of the display panes on the touch panel display; and
responsive to an amount of intended movement of the point of intersection indicated by the detected touching:
(a) moving the point of intersection on the touch panel display by the intended movement amount;
(b) concurrently increasing size of at least one of the display panes and an amount of the respective page displayed in the increased size display pane, based on the intended movement amount of the point of intersection; and
(c) reducing size of at least two of the display panes and reducing an amount of the respective pages displayed in each reduced size display pane, based on the intended movement amount of the point of intersection.

17. A mobile terminal device comprising a touch panel display and a controller configured to operate the mobile terminal device to perform the method of claim 16.

18. An article of manufacture, comprising:
a non-transitory machine readable storage medium; and
programming instructions embodied in the medium for execution by a programmable controller of a mobile terminal device having a touch panel display and a wireless transceiver, wherein execution of the programming instructions by the programmable controller causes the mobile terminal to implement tasks, comprising tasks to:
display an active viewing space comprising four display panes and one point of intersection of boundaries of all the display panes, on the touch panel display of the mobile terminal, each of the four display panes displaying a different respective page;

detect touching of the touch panel display in such a manner as to indicate user intent to move the point of intersection of the boundaries of the display panes on the touch panel display; and responsive to an amount of intended movement of the point of intersection indicated by the detected touching:
- (a) move the point of intersection on the touch panel display by the intended movement amount;
- (b) concurrently increase size of at least one of the display panes and an amount of the respective page displayed in the increased size display pane based on the intended movement amount of the point of intersection; and
- (c) reduce size of at least two of the display panes and reduce an amount of the respective pages displayed in each reduced size display pane, based on the intended movement amount of the point of intersection.

* * * * *